Sept. 8, 1964  R. C. PARKES ETAL  3,147,854
DRYING MACHINE

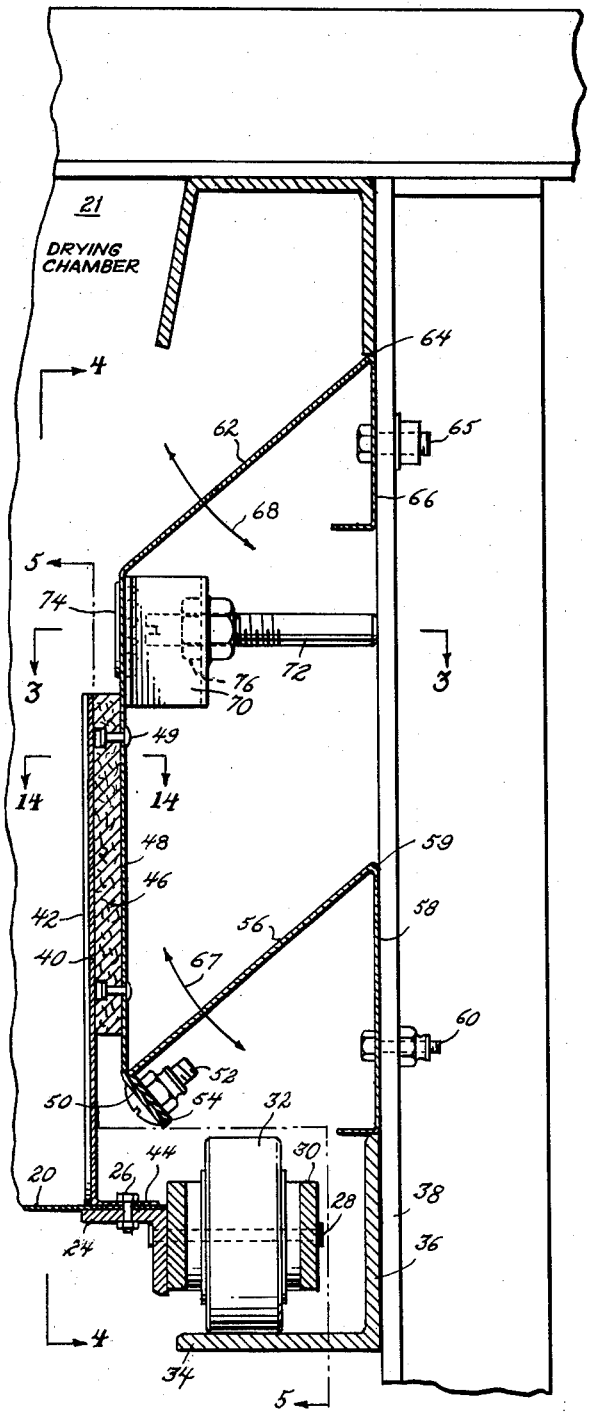
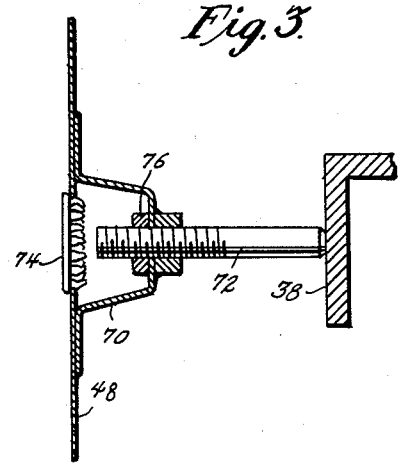

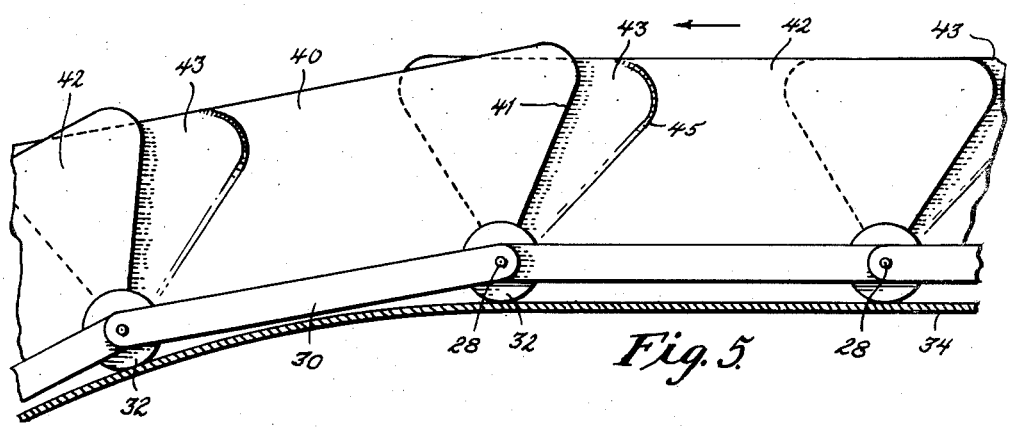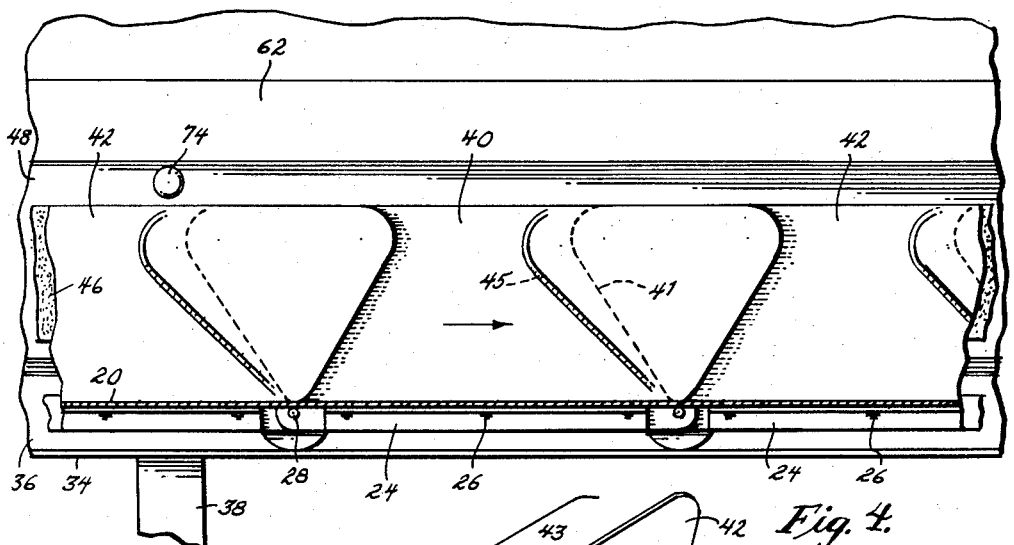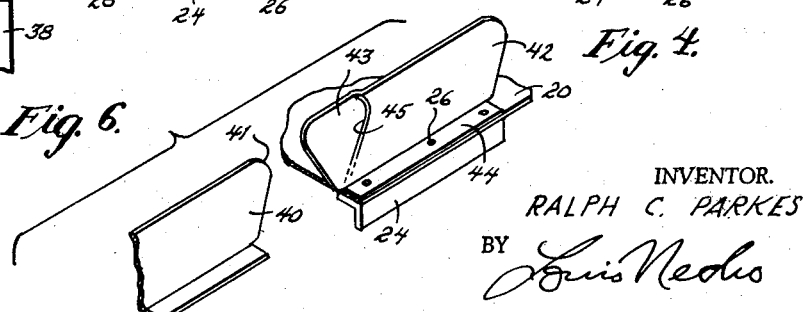

Original Filed April 18, 1959  7 Sheets-Sheet 4

INVENTOR.
RALPH C. PARKES
BY Louis Necks
ATTORNEY.

Sept. 8, 1964 R. C. PARKES ETAL 3,147,854
DRYING MACHINE
Original Filed April 18, 1959 7 Sheets-Sheet 5

INVENTOR.
RALPH C. PARKES
BY
ATTORNEY.

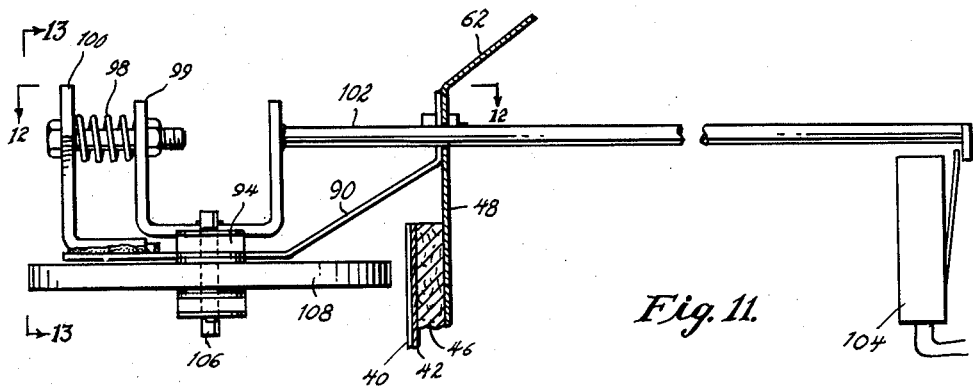
Fig. 11.
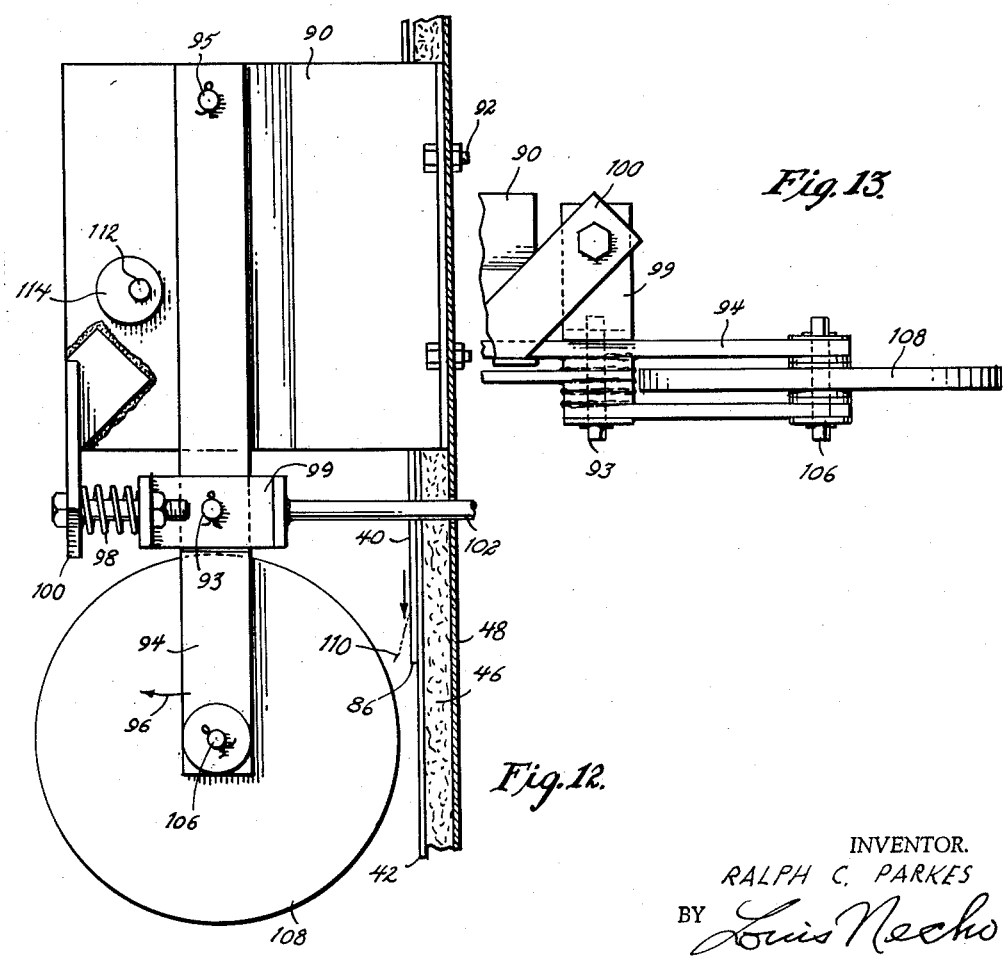
Fig. 13.
Fig. 12.
INVENTOR.
RALPH C. PARKES
BY
ATTORNEY.

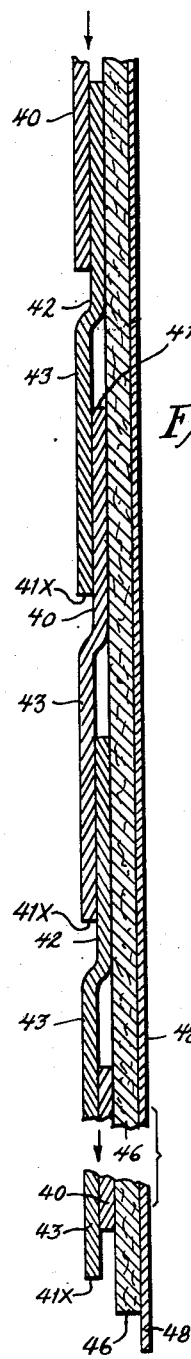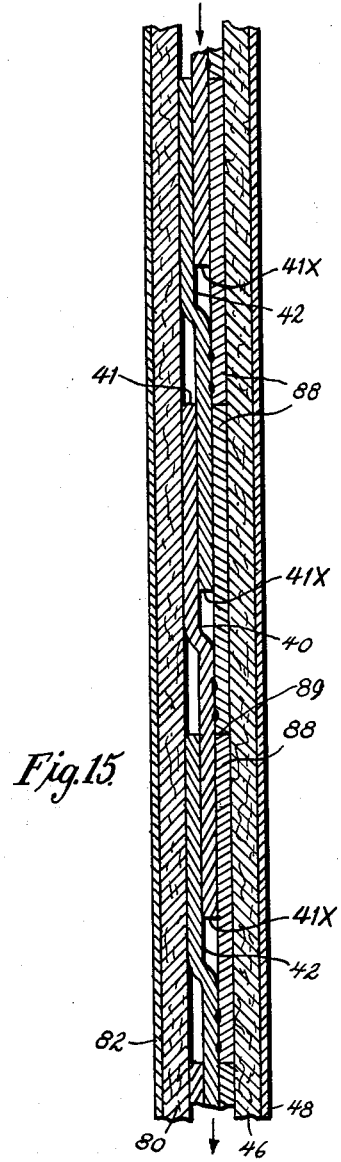

United States Patent Office 3,147,854
Patented Sept. 8, 1964

3,147,854
DRYING MACHINE
Ralph C. Parkes, Rydall, and Charles H. Schlecht, Cheltenham, Pa., assignors to The National Drying Machinery Co., Philadelphia, Pa., a corporation of Pennsylvania
Continuation of application Ser. No. 806,324, Apr. 18, 1959. This application Dec. 11, 1961, Ser. No. 160,692
4 Claims. (Cl. 198—232)

This invention relates to a drying machine of the type which includes a drying chamber, a conveyor for moving the material through the drying chamber, and means for bringing a drying medium to bear against the material to be dried.

More specifically, the invention relates to a drying machine for use in drying more or less comminuted material which is placed directly on the conveyor, or in receptacles carried by the conveyor, and in which the movement of the conveyor and the turbulence of the air cause some of the material to fall off the conveyor with undesirable consequences.

One object of this invention is to produce an improved drying machine in which the conveyor is provided with articulated guards which are carried by the opposite edges of the conveyor to prevent the material from falling off the conveyor.

A further object is to provide means for stopping the machine and by simultaneously activating an audible, or a visual warning signal in the event that one of the moving guards is bent out of line.

The full nature of the invention will be understood from the following specification and the accompanying drawings in which:

FIG. 2 is an enlarged vertical sectional view taken on line 2—2 on FIG. 1 and showing the parts omitted from FIG. 1.

FIG. 3 is a horizontal sectional view looking in the direction of line 3—3 on FIG. 2, certain parts being omitted.

FIG. 4 is a sectional view looking in the direction of line 4—4 on FIG. 2 and showing the moving guards as they appear when moving horizontally.

FIG. 5 is a sectional view looking in the direction of line 5—5 on FIG. 2 and showing the moving guards as they appear as the conveyor begins to move over a large supporting or driving sprocket wheel, not shown.

FIG. 6 is an exploded perspective view showing details of the articulated moving guards.

Figure 7:
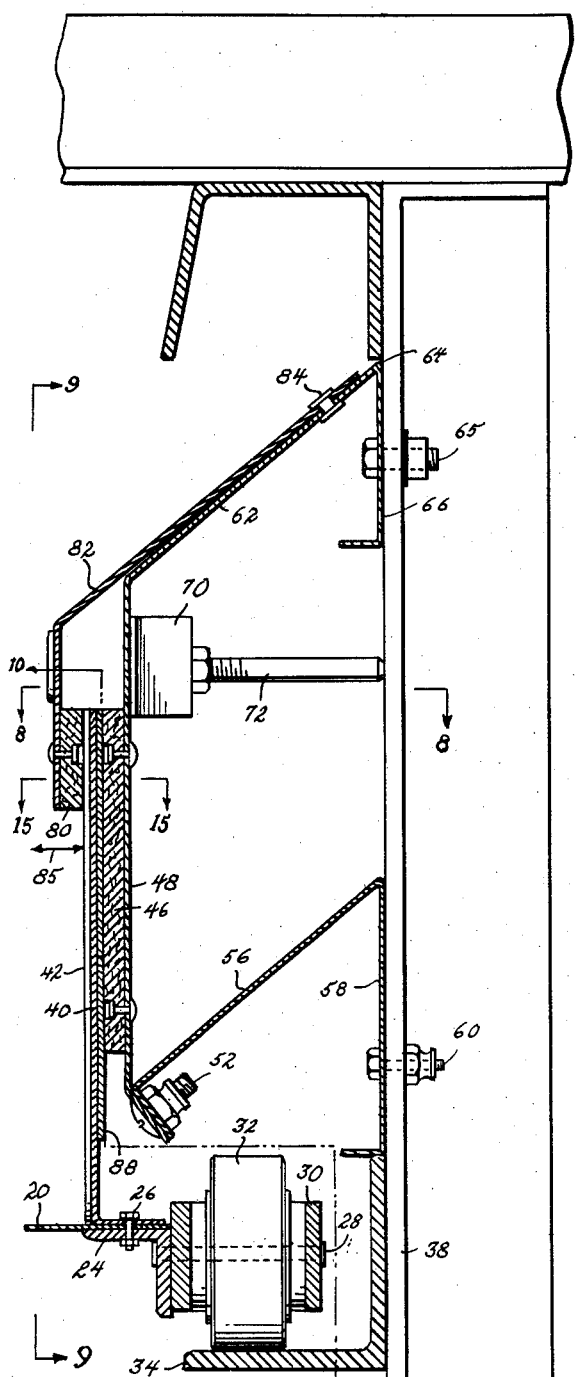
FIG. 7 is similar to FIG. 2 but showing a second embodiment of the moving guard.
Figure 10:
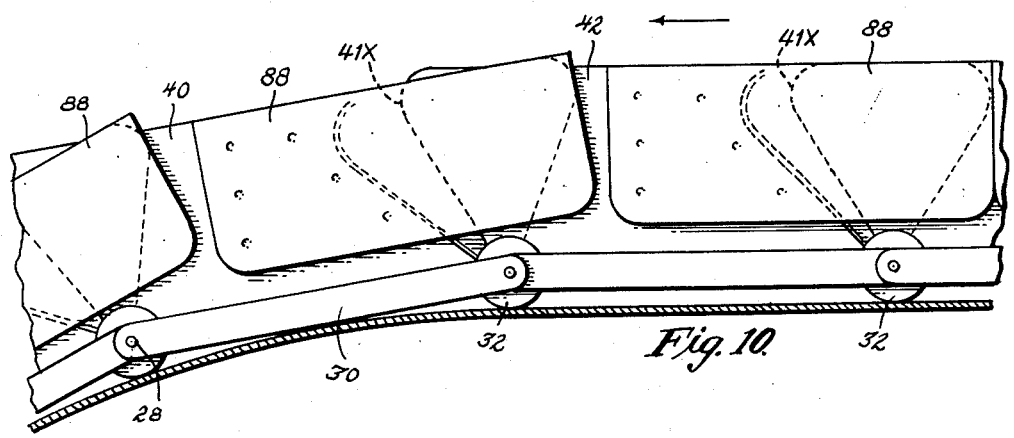
Figure 9:
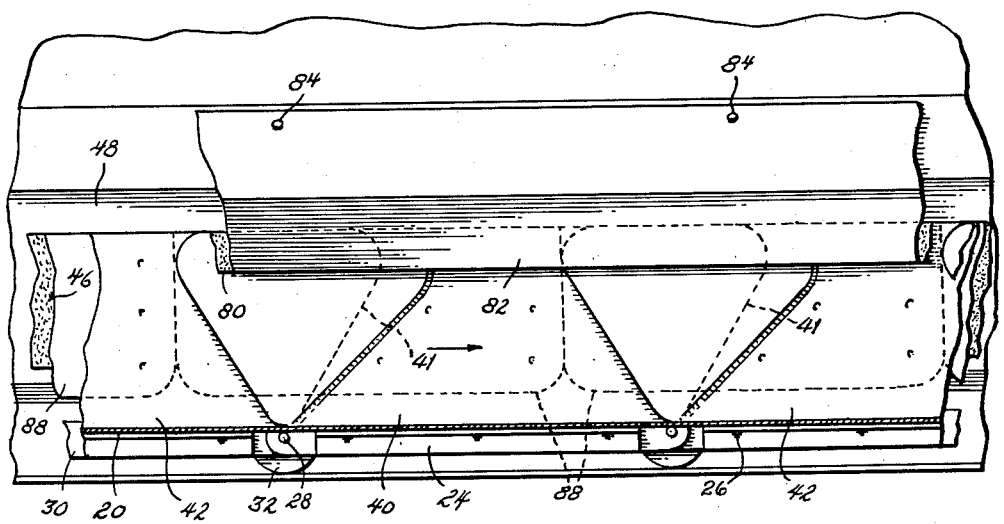

FIGS. 9 and 10 are similar to FIGS. 4 and 5 except that they are taken on lines 9—9 and 10—10, respectively, on FIG. 7.

Figure 1:
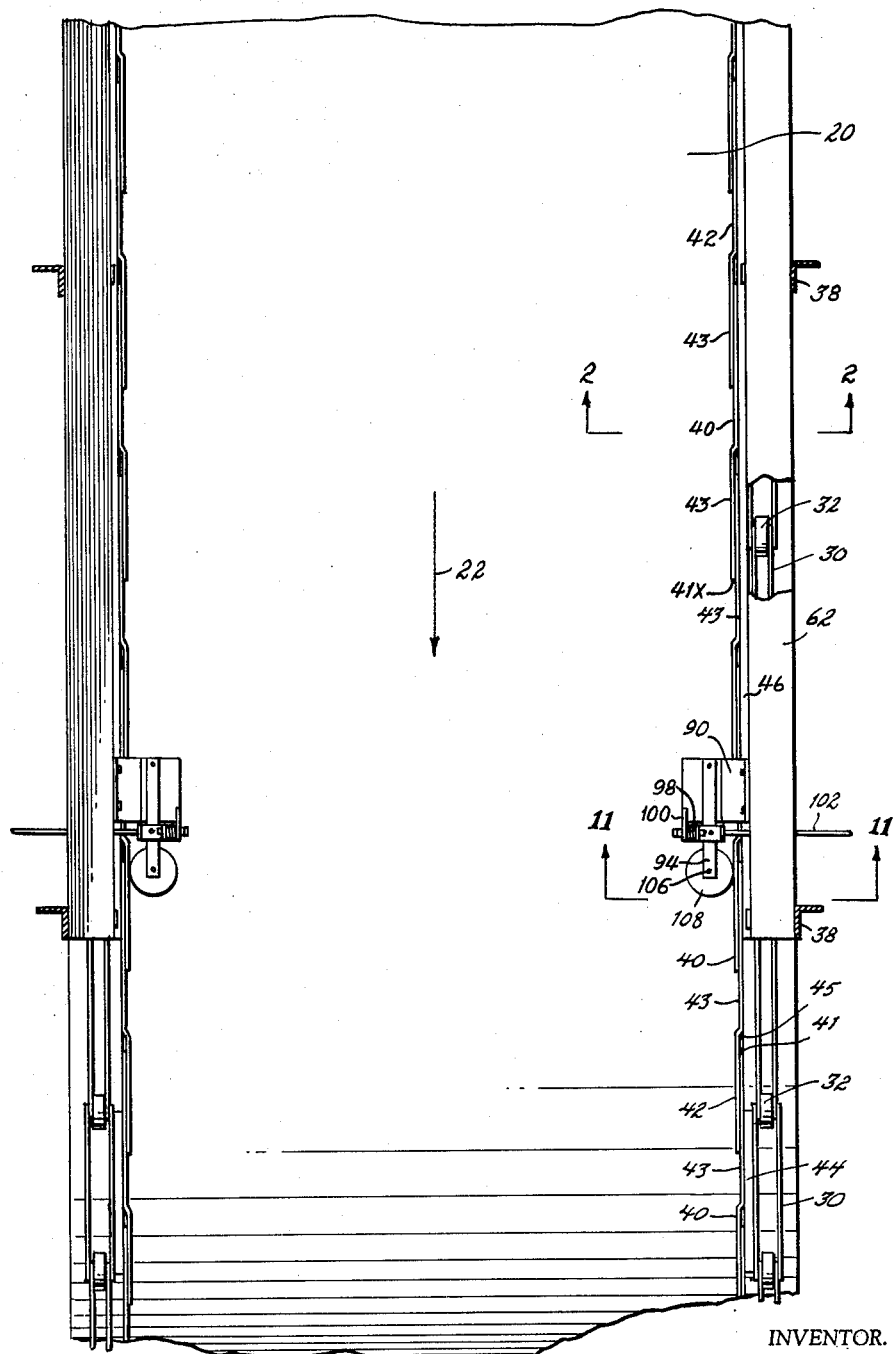
FIG. 1 is a view, partly in top plan and partly in horizontal section, of a portion of the drying chamber of a drying machine, and a portion of a conveyor, embodying our invention, certain parts being omitted for clarity of illustration.

FIG. 11 is an enlarged fragmentary view looking in the direction of line 11—11 on FIG. 1.

FIG. 12 is an enlarged fragmentary view looking in the direction of line 12—12 on FIG. 11.

FIG. 13 is a view looking in the direction of line 13—13 on FIG. 11.

FIG. 14 is an enlarged sectional view taken on line 14—14 on FIG. 2.

FIG. 15 is an enlarged sectional view taken on line 15—15 on FIG. 7.

In FIG. 1 of the drawing, there is shown, in a highly diagrammatic manner, a portion of a belt conveyor 20 which is propelled endlessly through a drying chamber 21, which is not shown in detail, but which corresponds to the chamber designated by reference numeral 2 in Parkes Patent No. 1,997,696 of April 16, 1935. For the purpose of this disclosure, it is enough to point out that conveyor 20 moves endlessly in the direction of arrow 22 in FIG. 1, which corresponds to arrow 40 in said Parkes patent; that the material to be dried is placed directly on the conveyor, or in receptacles placed on the conveyor, and that the material to be dried, unless restrained, will fall off the opposite sides of the conveyor, or will be blown about by the turbulence of the drying medium, thus causing waste and damaging moving parts.

In order to prevent material from falling, or from being blown, off the conveyor, we provide fixed guards adjacent the opposite sides of the conveyor and we provide movable, articulated guards which are carried by the opposite sides of the conveyor and have a wiping relation relative to the fixed guards to provide a running seal along the entire length of the conveyor.

Since the fixed, and movable, guards on opposite sides of the conveyor are identical, the structure of only the guard at the right hand side of FIG. 1 will be described in detail.

As clearly shown in FIGS. 2, 5 and 6, the longitudinal edges of conveyor 20 are secured to spaced pieces of angles 24 by means of rivets or the like, 26 (FIGS. 1 and 9). These angles are secured by pins 28 to an endless sprocket chain 30 which carries spaced rollers 32 which ride on the horizontal portions 34 of continuous angles, which extend the length of the drying chamber and the vertical portions 36 of which are suitably secured to vertical side frame members 38 of the machine.

The articulated, movable guard consists of a number of plates 40 and 42, some of which are shown in FIGS. 4 and 14, and the shape of which is shown in FIG. 6. Each plate is provided with horizontal foot 44 which is secured to the edge of the conveyor 20 by rivets 26. As will be seen from FIGS. 1 and 14, the trailing edges 41 of plates 40 and 42 are overlapped by the offset portions 43 of plates 40 and 42. Also, it will be seen that the leading edges 41x of offset portions 43 of the plates are spaced from gasket 46. By this arrangement, only the trailing edges 41 of the plates are in contact with gasket 46, and, therefore, they cannot dig into the gasket as they might if the leading edges 41x of the plates were in contact with the gasket. Gasket 46 can be made from any tough and slightly resilient and flexible material, such as brake lining, leather, rubber, or the like. The gasket extends the entire length of the drying chamber and is secured to fixed guard plate 48 by rivets, or the like, 49. Plate 48 is provided with a lower flange 50 which is connected by screws 52 to flange 54 of a resilient plate 56 which is integral with, or is hinged, at 59, to plate 58 resiliently to support the lower end of plate 48. Plate 58 is suitably secured, as at 60, to rigid frame member 38. As will be seen from FIG. 2, plate 48 is extended beyond the upper edge of gasket 46 and is bent to form plate 62 which is integral with, or is hinged, at 64, to plate 66, which is secured, as at 65, to frame member 38. By this arrangement, the upper end of plate 48 is also yieldably supported so that the entire plate can tilt as indicated by lower and upper arrows 67 and 68 to insure constant adequate engagement between the moving guard formed of plates 40 and 42, and the stationary guard formed by gasket 46. In order to provide for adjustment beyond that inherent in the resilient mounting of gasket 46 by plate 48, we secure a bracket 70 to the inside of plate 48 and we engage the bracket by means of an adjustment bolt 72 carried by a frame member 38.

By appropriately turning bolt 72, bracket 70 will be moved to the right, or to the left, as viewed in FIGS. 2 and 3, and plate 48 will be correspondingly adjusted so as to achieve adequate yielding contact between gasket 46 and plates 40 and 42. Bolt 72 is adjusted by a screw driver, or the like, which is insertable through an opening which is normally closed by a removable plug 74.

Figure 8:
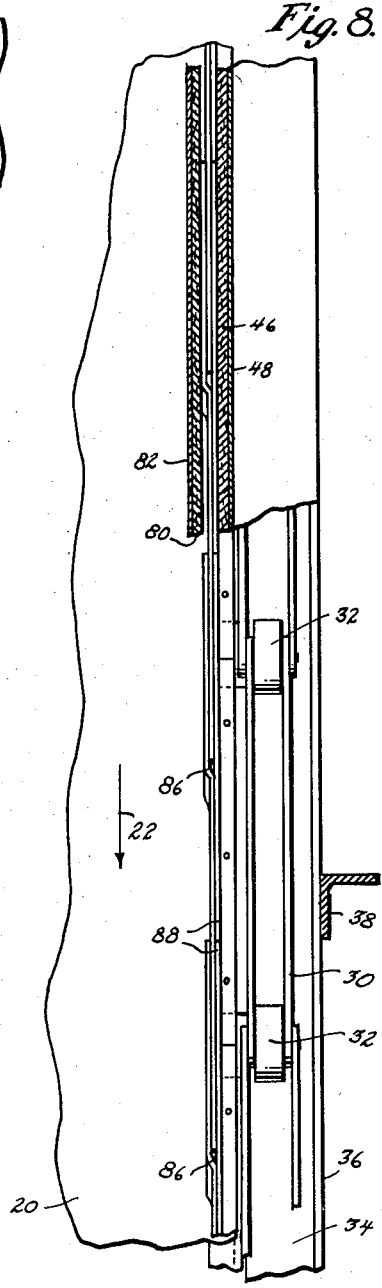
FIG. 8 is a reduced view, partly in horizontal section and partly in top plan view looking in the direction of line 8—8 on FIG. 7.

The structure shown in FIGS. 7, 8 and 15 differs from the structure thus far described only by the addition of an auxiliary gasket 80 which extends the entire length of the conveyor and which is carried by plate 82 which is loosely mounted, as at 84, so that gasket 80 has some play in the direction of arrow 85 and bears against the moving guard plates 40 and 42 by gravity only. In order to protect auxiliary gasket 80 against damage by the leading edges of plates 40 and 42, which would happen if gasket 80 were imposed on the structure shown in FIG. 2, we reverse the relation of plates 40 and 42 so that the trailing edges of the guard plate will contact gasket 80. But reversing the relation of the plates exposes gasket 46 to the leading edges 41x of plates 40 and, in order to protect gasket 46, we provide plates 88, the edges of which abut, as at 89, when the guard is moving in a straight line, as shown in FIG. 15, but which fan out, with guard plates 40 and 42, as shown in FIGS. 5 and 10, when the conveyor curves, as when it is moving over a sprocket wheel. Plates 88 may be secured to plates 40 and 42 in any suitable manner, not shown.

The machine is also provided with safety devices which will automatically inform the operator, or which will automatically stop the machine, in the event that the leading edge 86 of a plate 40, or 42, below gasket 80, should become deflected in the direction of the center of the conveyor to an extent in excess of a predetermined tolerance. As shown in FIG. 1, there is a safety device on each side of the conveyor, and, since the safety devices are identical, only one of them is shown and described in detail. As will be seen from FIGS. 11, 12 and 13, each safety device includes a bracket 90 which is secured, at 92, to the previously mentioned plate 48 of the machine and which carries arm 94 which is pivoted at 95 to the bracket 90 so as to be movable in the direction of arrow 96. Arm 94 is tensioned to the right, as viewed in FIGS. 1, 11 and 12 by a spring 98 which is confined between bracket 99 which is secured to arm 94 at 93 and bracket 100 which is carried by bracket 90. Arm 94 carries a roller 108 which is normally spaced from the leading edges 41x of plates 40 or 42, approximately, as shown in FIG. 12, to permit free passage of plates 40 and 42 as long as said leading edges are not deflected to a greater extent than that shown by broken line 110. The resistance of spring 98 is such that, if the deflection of the leading edges of plates 40 and 42 is not excessive, roller 108 will tend to bend the leading edges of the plates back from the broken, to the solid, line position of FIG. 12. If, however, the deflection of the leading edges of plates 40 and 42 is excessive, or if something is jammed between roller 108 and the moving guard, roller 108 and arm 94 will be moved far enough to the left, as viewed in FIG. 12, to allow the plates to pass without damage and to close switch 104 which will set off an alarm, or will stop the machine, or both. In order to adjust the distance to which arm 94 may be moved against the action of spring 98, we provide pin 112 which rotatably carries eccentric 114. As shown in FIG. 12, the eccentric permits maximum movement of arm 94, but, it will be noted, that rotation of the eccentric on pin 112 will correspondingly limit the motion of arm 94. The clearance between the periphery of roll 108 and the moving guard will vary according to the required tolerance and other conditions and the same is true as to the position of pin 112 and eccentric 114 which determine the movement of arm 94.

From the foregoing it will be seen that by suspending gasket 80 by resilient member 82, the gasket will only have a light wiping contact with the face of the guard and will not exert an appreciable pressure against the guard, as would be the case if the gasket is spring-loaded. The light contact of the gasket with the face of the guard reduces friction and therefore reduces the heat and wear which are concommittants of friction. It will be noted that member 82 is highly resilient and that it supports the gasket in such a position relative to the face of the guard that, in seeking its center of gravity, the gasket will contact the guard with a force which is substantially equal to the weight of the gasket. This relatively "free suspension" of the gasket permits it to tilt in response to a slight tilt by the guard, thus instantly compensating for even minor displacements of the plane of the side of the guard facing the gasket. It will be noted that gasket 80 acts on the upper portion of the guard which is more easily bent than the lower portion thereof and, hence, any appreciable pressure against the upper face of the guard is undesirable.

For some applications, gasket 80 can be used alone and for others, a combination of gasket 80 and gasket 46 is preferred.

This application is a continuation of application, Ser. No. 806,324, filed April 18, 1959, entitled Drying Machine, which was allowed on September 21, 1961, now abandoned.

What we claim is:

1. For use in connection with a conveyor,
    a stationary, rigid support parallel to, and spaced from, the edge of the conveyor,
    a wall disposed in a plane normal to the plane of the conveyor and overlying said conveyor inwardly of the edge thereof,
    a gasket carried by said wall,
    upper and lower resilient walls disposed at an acute angle to said wall and connected to the upper and lower edges thereof, respectively,
    means hingedly securing said resilient walls to said support,
    a guard carried by said conveyor with one side thereof movable against said gasket,
    and an adjustment screw carried by one end of said wall and engageable with said support for tilting said wall and the gasket carried thereby to compensate for any tilting of said guard to insure adequate surface-to-surface contact between said gasket and said guard.

2. The structure recited in claim 1 and an auxiliary gasket and means resiliently suspending said auxiliary gasket in a position to abut the opposite surface of said guard, with a force which is a function of the weight of said auxiliary gasket.

3. In combination,
    a moving conveyor,
    a stationary guard adjacent the edge of the conveyor,
    a movable guard carried by said conveyor and having wiping contact with said fixed guard,
    a first pivoted arm adjacent the edge of the conveyor,
    a roller carried by said first arm at a predetermined distance from said movable guard,
    a spring yieldably retaining said roller at said distance,
    a remote, normally open alarm switch for controlling the movement of said conveyor,
    and a second arm connected to said first arm and to said switch and operable, upon movement of said roller against the action of said spring to close said switch, the force of said spring being of a value such that the deflection of the moving guard into contact with said roller, or the jamming of a foreign object between said moving guard and said roller, moves said second arm in switch-closing direction.

4. For use in connection with a conveyor,
    a stationary, rigid support adjacent a longitudinal edge of the conveyor, a wall disposed in a plane normal to the plane of the conveyor and overlying said conveyor inwardly of the edge thereof,
a gasket carried by said wall,
means hingedly securing said wall to said support,
a guard carried by said conveyor with one side thereof movable against said gasket,
and adjustment means carried by one end of said wall engageable with said support for tilting said wall and the gasket carried thereby to compensate for any tilting of said guard to insure adequate surface-to-surface contact between said gasket and said guard,
an auxiliary gasket and resilient means swingably suspending said auxiliary gasket in a position to abut the opposite surface of said guard (remote from said first-mentioned gasket), with a force which is a function of the weight of said auxiliary gasket.

References Cited in the file of this patent

UNITED STATES PATENTS

| | | |
|---|---|---|
| 2,304,692 | Hurxthal | Dec. 8, 1942 |
| 2,336,698 | Morrill | Dec. 14, 1943 |
| 2,732,631 | Black | Jan. 31, 1956 |
| 2,820,307 | Bogaty | Jan. 21, 1958 |
| 2,960,212 | Black | Nov. 15, 1960 |